Nov. 14, 1961  E. R. GILL, JR  3,008,647
HIGHWAY STRIPING APPARATUS
Filed Sept. 1, 1959  3 Sheets-Sheet 1
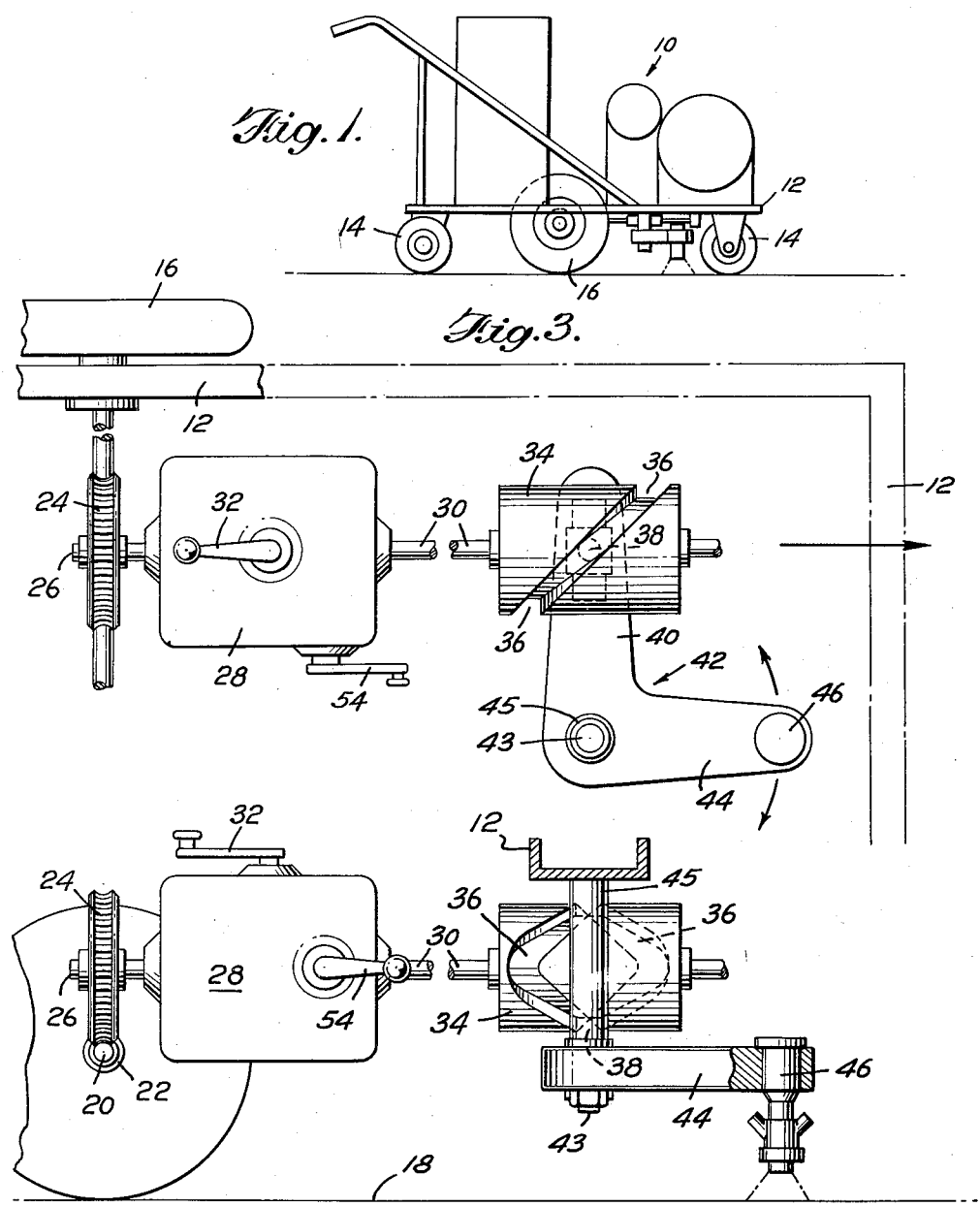
INVENTOR
Edwin R. Gill, Jr.
BY Karl W. Flocks
ATTORNEY Nov. 14, 1961 E. R. GILL, JR 3,008,647
HIGHWAY STRIPING APPARATUS
Filed Sept. 1, 1959 3 Sheets-Sheet 2

INVENTOR
Edwin R. Gill, Jr.

BY Karl W. Flocks
ATTORNEY

Nov. 14, 1961   E. R. GILL, JR   3,008,647
HIGHWAY STRIPING APPARATUS
Filed Sept. 1, 1959   3 Sheets-Sheet 3

INVENTOR
Edwin R. Gill, Jr.

BY  Karl W. Flocks
ATTORNEY

United States Patent Office
3,008,647
Patented Nov. 14, 1961

3,008,647
HIGHWAY STRIPING APPARATUS
Edwin R. Gill, Jr., Hiddenhurst, N.Y., assignor to
Karl W. Flocks, Washington, D.C.
Filed Sept. 1, 1959, Ser. No. 837,465
1 Claim. (Cl. 239—150)

The present invention relates to apparatus for marking a surface. More particularly the present invention relates to highway striping apparatus that is adapted to apply various line configurations to the highway surface and in accordance with the traffic requirements.

The conventional form of center striping currently applied to highways includes a longitudinally extending line which is usually four inches in width. Variations of the center line are provided in accordance with the particular highway requirements and include the interrupted or dash line to indicate a passing zone; double-solid lines to indicate no passing zones; and parallel solid and dash lines to indicate concurrent passing and no passing zones on both sides of the center lines.

Prior to the instant invention, all of the heretofore known markings were applied longitudinally with respect to the direction of the highway and consequently were viewed in substantially end direction by motorists using the highway. It is known that in continuous driving, the conventional center lines appear to unwind like a ribbon and soon become monotonous to the motorist. This monotony produced by the ribbon-like lines tends to cause the driver to become inattentive and careless in operating his vehicle and is particularly apparent on modern super-highways. It is further recognized that variations in road patterns or landscaping will relieve the motorist of mental strain and will cause him to be more attentive in his driving.

The striping apparatus embodied in the present invention is designed to apply striping to a highway that extends diagonally with respect to the direction of travel, the diagonal stripes being applied in various predetermined patterns to indicate particular zones of travel to passing motorists. There are numerous combinations and patents of diagonally extending stripes that may be formed with this apparatus, but only the simplest has been shown here to illustrate the apparatus and its use. These diagonally extending stripes are designed to replace the conventional type of longitudinally extending stripes and will be employed as center line markings in the usual manner, that is, to indicate traffic lanes, passing and no-passing zones.

It is therefore an object of the present invention to provide apparatus for applying diagonally extending traffic stripes to a roadway surface.

Another object of the present invention is to provide highway striping apparatus that includes cam controlled paint guns that are adapted to apply diagonal center line striping.

Still another object of the present invention is to provide apparatus for traversing a spray gun in a predetermined manner to apply a diagonally extending traffic stripe on a highway.

Still another object is to provide highway marking apparatus for operating a pair of spray guns that simultaneously apply diagonally extending traffic lines to a roadway surface.

Other objects and the nature and advantages of the instant invention will be apparent from the following description taken in conjunction with the accompanying drawings, wherein:

FIG. 1 is a side elevational view of a striping machine on which the striping control apparatus embodied in the present invention is mounted, the component parts of the striping machine being illustrated diagrammatically.

FIG. 2 is an enlarged view of the striping machine in elevation with parts shown in section of one form of striping control apparatus embodied in the present invention.

FIG. 3 is a plan view of a portion of the apparatus shown in FIG. 2.

Figure 4:
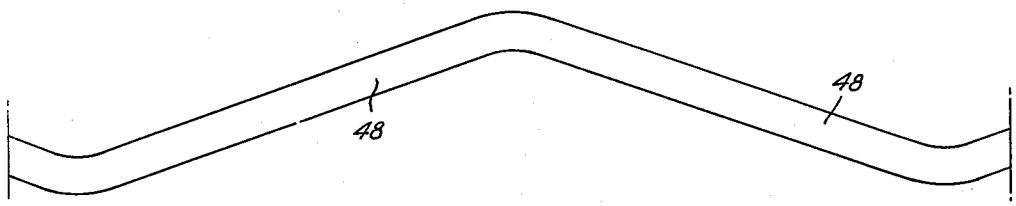
FIG. 4 is an enlarged development in plan of the groove of the cam shown in FIGS. 2 and 3.

The striping apparatus embodied in the present invention may be utilized with any conventional striping machine and has particular application in the small vehicular type which is adapted to be self-propelled.

Referring now to the drawings and particularly to FIG. 1, one form of the invention is illustrated and is shown mounted on a tri-wheeled self-propelled striping vehicle generally indicated at 10. The striping machine 10 includes a frame 12 upon which is mounted the striping equipment, such as the internal combustion engine, compressor, paint receptacle, and other required parts. Rotatably mounted on suitable axles below the frame 12 are wheels 14 which define the tricycle wheel arrangement and a fourth wheel or ground wheel 16 is also rotatably journalled on a hub secured to the frame 12, the ground wheel 16 being adapted to supply the motion for operating the striping mechanism, as will be described hereinafter.

Referring now to FIGS. 2 and 3, one form of the invention is illustrated and includes the ground wheel 16 that engages a roadway 18 and that is rotatably mounted on an axle 20, the axle 20 being suitably secured to the frame 12. Secured to the ground wheel 16 and rotatably mounted on the axle 20 is a worm 22 that engages a worm gear 24, the worm gear 24 transferring the drive from the ground wheel 16 to the paint striping actuating mechanism to be described hereinafter. The worm gear 24 is secured to a drive or gear shaft 26, which as shown in FIG. 3, is journalled in the side wall of a transmission 28. Extending outwardly from the opposite wall of the transmission 28 is a cam shaft 30 that is operatively connected to the drive shaft 26 through the transmission gearing (not shown) and is adapted to be driven at a stepped-up or stepped-down speed, depending upon the existing striping requirements. Although bearings and journals for the shafts are not shown, it is understood that they may be of any conventional form. As shown in FIG. 3, a gear changing hand control 32 is provided and extends into the transmission 28, being operatively connected to the gearing assembly disposed therein and being adapted to change the gear ratios to effect a step-up or step-down in the speed of rotation of the cam shaft 30. As will be described hereinafter, by varying the speed of the cam shaft 30, the length of the traffic stripe being applied to a roadway will be varied.

Secured to the cam shaft 30 is a cylindrically shaped cam 34 in which a helical trackway or groove 36 is formed. Positioned in the cam groove 36 is a cam follower 38 that is mounted on the end of an arm 40 of a bell crank indicated at 42. The bell crank is pivotally mounted on a shaft 43 that is positioned within a standard 45, the standard 45 being secured to the frame 12 in an upright position. An arm 44 is secured to the arm 40 and mounted in the outermost end of the arm 44 and depending therefrom is a paint gun 46. The paint gun 46 is of the usual type for applying traffic line striping and includes the conventional parts for receiving the paint and admixing air and the air under pressure for the operation of the paint gun control valve. Although not shown in the drawings, it is understood that some form of control device may be employed for controlling the operation of the paint gun control valve and would generally be a cam operated air control valve that is well known in the art and forms no part of the present invention. It is sufficient to point out that the heretofore known cam operated control valve is adapted to control the paint spray gun in such a manner so as to cause the paint gun to eject a paint spray in an interrupted manner whereby a broken or dash line is applied to the surface being marked.

In operation of the paint striping apparatus illustrated in FIGS. 2 and 3, the ground wheel 16 which engages the roadway 18 and is rotated as the striping machine is propelled along the surface thereof, is caused to rotate in accordance with the speed of the vehicle 10. Rotation of the ground wheel 16 causes the shaft 26 to rotate which then operates the transmission gearing and rotates the cam shaft 30 and cam 34 secured thereto. As the cam 34 rotates, the follower 38 is moved in a path corresponding to the formation of the cam groove 36 and this path is illustrated by the development 48 of the cam groove shown in FIG. 4. Since the bell crank 42 is secured to the follower 38, the bell crank 42 and paint gun 46 are also caused to be moved in a path corresponding to that shown in FIG. 4. This movement may best be described as diagonal with respect to the direction of travel of the paint striping machine or the longitudinal direction of the roadway. The diagonal movement of the paint gun 46 is of course achieved as a result of the forward travel of the striping machine as the paint gun is forced to follow the path of the cam groove 36, and the amount of diagonal movement with respect to the center position of the paint gun can be varied in accordance with the striping requirements by varying the position of the cam groove. In normal striping operations the paint gun will be caused to travel four inches to the right and left of center, thereby effecting a stripe that has a total width of twelve inches.

Figure 5:
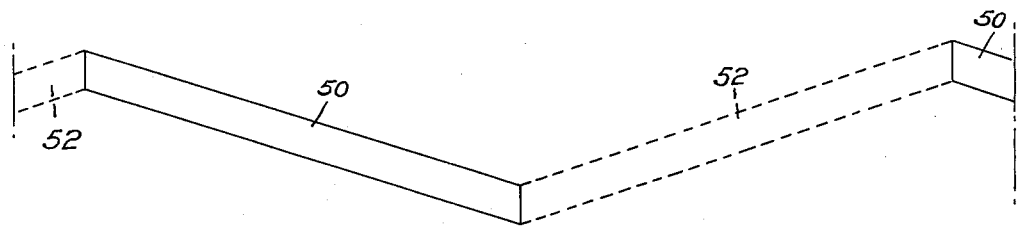
FIG. 5 is a representation of a traffic line as it is applied to a roadway by the apparatus illustrated in FIGS. 2 and 3.

The apparatus shown in FIGS. 2 and 3 is applicable in particular for applying an interrupted or dash line to a roadway and during this operation it is understood that the cam operated air control valve (not shown) for causing intermittent spraying of paint is adapted to control the operation of the paint gun 46. Referring now to FIG. 5, a line simulating a dash line is illustrated and includes a solid diagonal portion 50 and a dotted diagonal portion 52. The combined solid line 50 and dotted line 52, the latter of which represents a no-striping zone, is the same as the cam groove path 48 shown in FIG. 4 and is applied by the spray gun 46 as the striping machine is moved in a forwardly direction. The valve for controlling the operation of the spray gun 46 is controlled so that the paint spray is interrupted at intervals and a series of diagonal lines 50 are thereby applied to the surface 18 being marked. When seen by approaching motorists these diagonal lines present an unusual effect and appear to be interrupted, thereby signaling a passing zone to the motorists.

If it is desired to lengthen or shorten the solid and interrupted portions of the diagonal lines, the manual control handle 32 may be rotated to change the transmission gear ratio, thereby causing the speed of the output or cam shaft 30 to be changed. A change in speed of the rotation of the cam 34 will then cause a corresponding change in the line applied by the paint gun 46.

It is also possible to apply continuous or conventional lines with the apparatus shown in FIGS. 2 and 3 and for this purpose an immobilizing crank 54 is operatively secured to the transmission 28. Actuation of the immobilizing crank 54 disengages the transmission gearing from the shaft 30 and acts to lock the shaft against rotation. It is contemplated also to interlink the crank 54 and handle 32 so that neither can be engaged until the other is disengaged. Thus, it is seen when the handle 32 is moved to a neutral position, the shaft 30 may be rotated to locate the paint gun in the desired position and the crank 54 is then moved to lock the shaft 30 from rotation along with the cam 34, the paint gun 46 thereby being retained in a fixed position for applying a standard road stripe.

Although only one paint gun is shown in the apparatus illustrated in FIGS. 2 and 3, it is understood that two or more guns may be employed and will be controlled in the manner described hereinabove.

Figure 6:
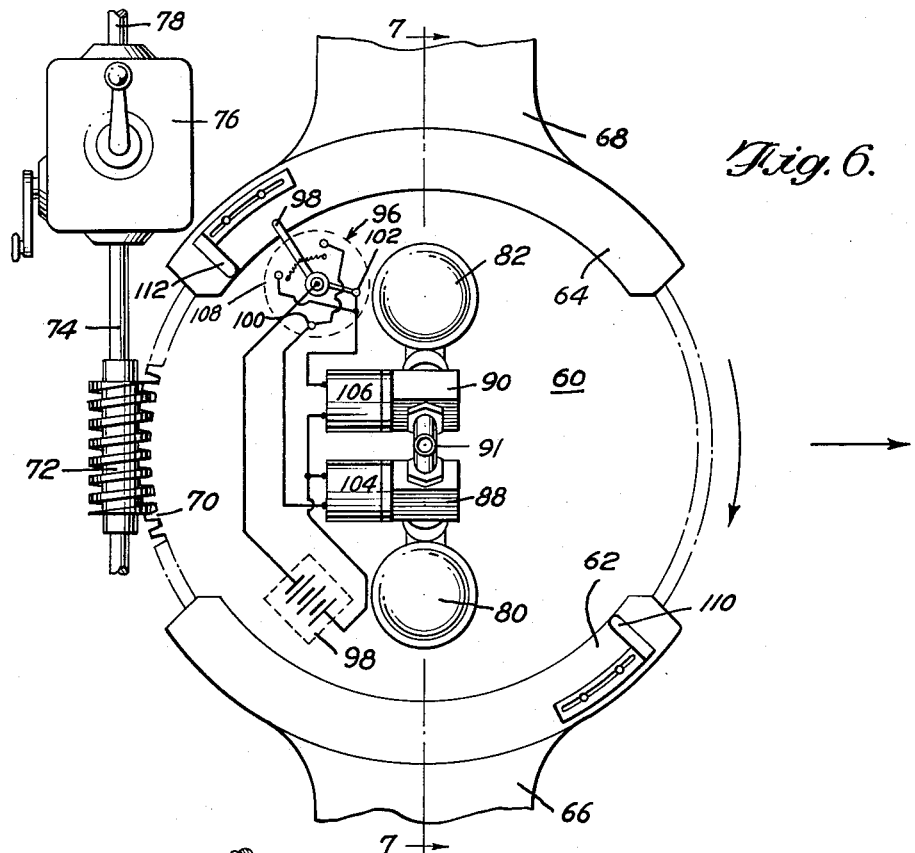
FIG. 6 is a detailed diagrammatic illustration of another form of the present invention.
Figure 7:
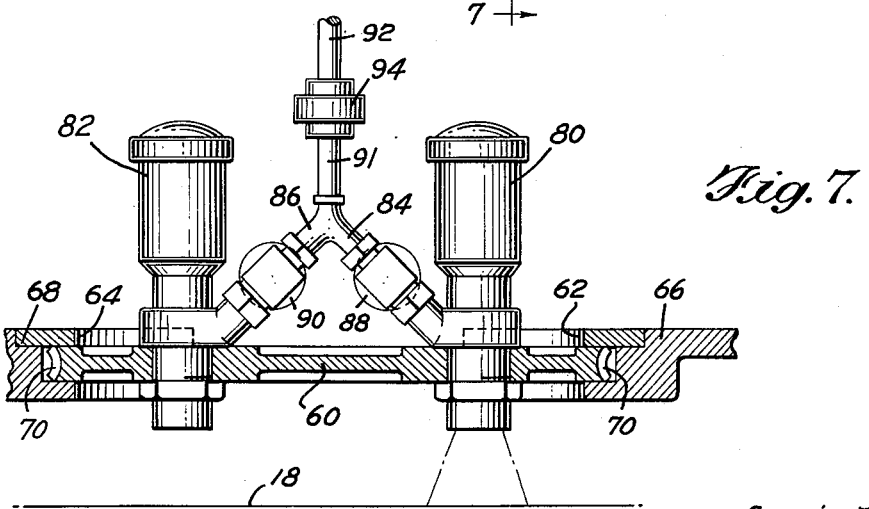
FIG. 7 is a view taken along line 7—7 of FIG. 6.

Referring now to FIGS. 6 and 7 another form of the invention is illustrated and is adapted to be employed with the striping apparatus shown in FIG. 1.

Figure 8:
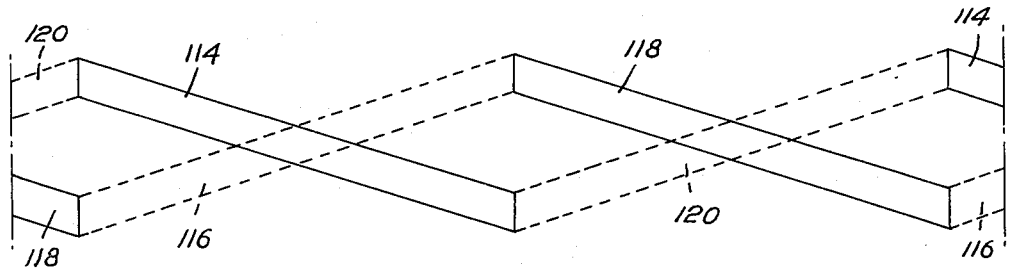
FIG. 8 is a representation of a traffic line as it is applied to a roadway by the apparatus illustrated in FIGS. 6 and 7.

The striping control device shown in FIGS. 6 and 7 is adapted to apply a double diagonal line as illustrated in FIG. 8, whereby a solid center line is simulated. In order to simulate the solid line, the terminal end of one diagonal line must be positioned in juxtaposition to the leading end of the adjacent diagonal line. Thus, when viewed on end as by an oncoming motorist, the line appears to be solid. Due to the unusual appearance of the stripe occasioned by the diagonal lines, the motorist will be constantly attentive to his driving.

The modified striping control device as illustrated diagrammatically in FIG. 6 includes a circular plate 60 that is mounted for rotation beneath arcuate portions 62 and 64 of supports 66 and 68 respectively, the supports forming part of the frame 12. Formed on the outer edge of the plate 60 are peripheral gear teeth that define a worm gear 70. Operatively engaging the worm gear is a worm 72 that is secured to a shaft 74, the shaft 74 defining the output shaft of a transmission 76. The transmission is similar to the transmission 28 described above and is operatively connected to the ground wheel 16 through an input shaft 78.

Formed in the plate 60 and disposed 180° apart are a pair of openings that receive a pair of paint guns 80 and 82 respectively therein, the paint guns 80 and 82 being securely mounted for movement with the circular plate 60. Communicating with the paint guns 80, 82 are paint conduits 84, 86 respectively (FIG. 7), solenoid operated valves 88, 90 being disposed in the conduits 84, 86 and controlling the flow of paint therethrough. The conduits 84, 86 junction into a single paint conduit 91 which communicates with a paint supply line 92 through a swivel coupling 94, the paint supply line 92 communicating with a source of paint that supplies the paint to the line 92 under pressure. It is seen that the plate 60, the paint guns 80, 82, solenoid valves 88, 90, conduits 84, 86 and 91 all rotate as a unit and relative to the fixed paint supply line 92.

In order to apply the double diagonal line shown in FIG. 8, the paint guns 80, 82 are adapted to be alternately operated 180° out of phase and for this purpose an electrical circuit is provided that cooperates with a switching mechanism to effect the desired operation. As shown diagrammatically in FIG. 6, the solenoid operated valves 88, 90 are electrically connected to a snap switch assembly indicated at 96 and to a source of voltage, such as a battery 98. The snap switch 96 is also connected to the battery 98 to complete the electrical circuit and may be of any conventional form that employs an over-center snap action. The snap switch 96 includes an actuating lever 98, the contact end of which is adapted to be alternately snapped into contacting engagement with contacts 100, 102 that are electrically connected to the coils 104, 106 of the solenoid valves 88, 90. As shown in FIG. 6, the switch assembly 96 and the battery 98 may be conveniently located in a housing 108 that is mounted on the plate 60, the switch lever 98 extending outwardly therefrom.

In order to actuate the switch lever 98 to alternately operate the paint guns 80, 82, fixed switch bars 110, 112 are provided and are mounted 180° apart on the supports 66, 68 respectively. The switch bars 110, 112 are adapted to be engaged by the switch lever 98, and are positioned just forwardly of the location of the paint guns 80, 82 as illustrated in FIG. 6 and thus the solenoid valves 88, 90 are energized or deenergized in time to provide for operation or discontinuance of operation of the guns 80, 82 as they reach the midpoint of the supports 66 and 68.

In operation of the striping control apparatus illustrated in FIGS. 6 and 7, the paint guns 80, 82 are adapted to spray paint for 180° of travel as the plate 60 is rotated and the "on" position as shown in FIG. 6 is defined by the movement of a gun from the position occupied by paint gun 82 to the position occupied by paint gun 80. The "off" position is defined by the opposite 180° of travel from that described for the "on" position. As the paint guns approach the "on" position, the switch bar 112 engages the switch lever 98 to cause either the solenoid coil 104 or 106 to be energized, thereby opening the associated valve. Paint then flows through the appropriate line and into either paint gun 80 or 82, depending upon which has reached the "on" position. Since the striping machine is moving in a forwardly direction during the striping operation, the combined forward and rotary movement of the paint guns causes a diagonal line to be applied to the surface being marked. Referring to FIG. 8, it is seen that each of the guns 80, 82 must alternately operate for 180° of travel, thereby providing for the spacing of the parallel diagonal lines as shown. Thus as the gun 82 is spraying paint to apply solid diagonal line 114, the paint gun 80 is in the "off" position and moves in a direction defined by the dotted line 116. At this point, the snap switch lever 98 is actuated by the switch bar 110 to close the solenoid valve 90 and open the solenoid valve 88. The paint gun 80 then applies a solid diagonal line 118 for the next 180° of travel of the plate 60, while the gun 82 follows the path defined by the dotted line 120. At this point the switch bar 112 snaps the switch lever 98 to energize the solenoid coil 106 and the cycle is repeated.

Since the paint guns 80, 82 move in a continuous circle as the striping machine moves forwardly, if it is desired to apply reflex reflecting particles to the paint line for night time reflectivity, then a premix material may be used wherein the paint and reflecting elements are simultaneously sprayed into the surface being marked.

It is also contemplated applying the glass beads to the diagonal paint lines by the "drop-in" method and for this purpose a cam and bell crank, similar to cam 34 and bell crank 42 shown in FIG. 3, would be provided and would be spaced rearwardly from the unit illustrated in FIG. 3 and operatively connected to gear shaft 26. It is seen that a glass bead dispenser secured to the second bell crank would track the diagonally applied paint line and could be controlled to dispense glass beads thereon.

An alternative method could also be employed for applying the glass beads by the "drop-in" method whereby the paint gun and bead dispenser would both be mounted on a modified bell crank assembly that would be operated by a single cam. Thus the modified bell crank assembly would cause the bead dispenser to track the paint line and would be controlled to cut on and off at predetermined intervals and in accordance with the diagonal stripe applied.

It will be obvious to those skilled in the art that various changes may be made without departing from the spirit of the invention and therefore the invention is not limited to what is shown in the drawings and described in the specification but only as indicated in the appended claim.

What I claim is:

In a machine for striping highway center lines, a frame supported by wheels so that said machine may be rolled along a highway and over an existing center line or the highway area to be marked with a center line, a stationary pivot bearing secured to said frame and having its center located in position to be passed over the center of the center line to be marked upon the highway, a lever pivotally mounted in association with said pivot bearing, said lever having a first end and a second end on each side of said pivotal mounting, said second end of said lever being arranged for orbital movement in oscillating fashion through a line passing through the center of said pivotal mounting and over the center line of said highway to be marked, a paint spray generating means mounted on said second end of said lever for dispensing paint in the direction of said highway to be marked, means for oscillating said first end of said lever so as to effect said orbital movement of said second end of said lever, said means for oscillating said first end of said lever comprising a rotatable member, means for rotating said rotatable member continuously and unidirectionally.

References Cited in the file of this patent

UNITED STATES PATENTS

| | | |
|---|---|---|
| 2,007,524 | Emmons | July 9, 1935 |
| 2,026,678 | Hefner | Jan. 7, 1936 |
| 2,145,936 | Landeen | Feb. 7, 1939 |
| 2,555,693 | Heltzel | June 5, 1951 |
| 2,852,305 | Shaffer | Sept. 16, 1958 |

OTHER REFERENCES

Roads and Streets, November 1946, pages 74–78.

Budocks Technical Digest, Number 80, September 1957, pages 43–46.